March 19, 1963 F. MEYER ETAL 3,082,329
ELECTRONIC TIMING APPARATUS WITH PRECISE STARTING
POINT FOR SELECTED INTERVAL
Filed June 30, 1958

INVENTORS
FRANKLIN MEYER
ALFRED M. MULTARI
BY
S.C. Yuter
Attorney

United States Patent Office 3,082,329
Patented Mar. 19, 1963

3,082,329
ELECTRONIC TIMING APPARATUS WITH PRECISE STARTING POINT FOR SELECTED INTERVAL
Franklin Meyer, 708 Anderson Ave., Franklin Square, N.Y., and Alfred M. Multari, 287 Lindberg St., West Hempstead, N.Y.
Filed June 30, 1958, Ser. No. 745,467
29 Claims. (Cl. 307—88.5)

This invention relates to timing circuits and more particularly to circuits for generating signals at very precisely specified times.

In many control systems, it is often necessary to initiate control functions at precise times after the start of operations or to periodically generate control functions for precise time intervals. Generally, such initiating operations are performed by time delay devices which are either of the single-cycle type or of the multi-cycle type. Single-cycle time delay devices usually operate at a fixed time after the occurrence of an event such as the turning on of power in an electrical system. They operate just once and do not operate again until power is removed from the system and again turned on. Multi-cycle time delay devices operate periodically after power is turned on. They operate for a fixed period of time and are then inactive for another fixed period of time, and periodically cycle between these periods of activity and inactivity.

In the past, many single and multi-cycle time delay devices have been proposed and used. One of the more common of these devices is a thermal element which includes a heater coil and a thermostat. When electrical power is turned on in the system, the heater coil generates heat which raises the ambient temperature around the thermostat. When the temperature of the thermostat reaches a predetermined value, it completes a circuit which causes the generation of a control signal. By properly designing the heater coil, the thermostat, and their enclosure, it is possible to fix the time interval between the turning on of power and the generation of the control signal. A simple modification of this single cycle device produces a multi-cycle device. It is only necessary to include means for interrupting the flow of power to the single cycle device when it generates the control signal. Then the heater coil stops heating the thermostat, which starts cooling. At a certain temperature the thermostat drops out and the control voltage disappears. With the cessation of the control voltage, the heater coil again begins receiving electrical power and a new cycle begins.

Although relatively precise time intervals may be generated this way, there is a limit to their precision and reproducibility. If the control system is in a region of varying ambient temperature, the time interval will vary with this temperature. Furthermore, the errors in precision may be beyond the range that can be tolerated by the control system. To remedy these problems, electrically operating timing circuits have been provided.

These electrical timing circuits usually rely on the rate of build-up of a voltage across a reactive element such as a capacitor. In general, the rate of build-up of voltage is dependent on the magnitude of the reactive element and the magnitude of a resistance element interposed between the reactive element and the source of electrical energy which supplies the reactive element. The rate of build-up of voltage is sensed by a sensing circuit which is responsive to the reactive element. When the circuit senses a voltage of a predetermined magnitude, it generates a control signal. Unfortunately, the sensing circuit usually interacts with the reactive element to affect the precise rate of voltage build-up. Thus, the precison and reproducibility of the timing interval are affected.

In the presently available single-cycle devices, a more serious problem also exists. This is concerned with the recycling of the timing device. For example, a thermally operating element cannot recycle until it has first been cooled to a certain temperature. Thus, when electrical power is turned off after being on for a while, it is necessary to wait a sufficient length of time before power may again be turned on to insure that the desired time delay is obtained.

Conventional electrical timing circuits suffer from the same limitation because it is necessary to completely dissipate the electrical energy stored in the reactive element after the removal of power before reapplying power if a reliable timing interval is desired.

Generally, the presently used time delay devices cannot cope with interruptions of power which last for only a fraction of the time interval of the delay.

It is accordingly, a general object of the invention to provide an improved timing circuit.

It is another general object of the invention to provide an improved timing circuit.

It is another general object of the invention to provide an improved timing circuit which can generate very precise and highly reproducible time intervals.

It is a further general object of the invention to provide a timing circuit which can generate very precise and highly reproducible time intervals in the range from microseconds to minutes.

It is an object of one aspect of the invention to provide a single-cycle time delay circuit which is instantaneously recyclicable.

It is another object of this aspect of the invention to provide a single-cycle time delay circuit which requires substantially no time to dissipate any stored energy.

It is an object of another aspect of the invention to provide a mutli-cycle timing circuit which operates over very precise periods of time.

It is a still further general object of the invention to satisfy the above objects with timing circuits that are on the one hand highly reliable and reproducible, and on the other hand are rugged, compact and relatively inexpensive.

In accordance with a general aspect of the invention, an electronic circuit is provided comprising a first transistor having an input electrode, an output electrode, and a reference electrode, and a complementary transistor having an input electrode, an output electrode, and a reference electrode. A source of operating potential is also provided. The source of operating potential has a first terminal at a first potential, and a second terminal at a second potential. A timing network responsive to the source of operating potential is coupled to the input electrode of the first transistor. The output electrode of the first transistor is coupled to the input electrode of the complementary transistor. Means are further provided for establishing the proper operating potentials at the several electrodes of both transistors.

In general, during operation, the timing network starts operating in response to the application of the operating voltage. The timing network generates a voltage which, when it reaches a predetermined value, activates the first transistor which in turn activates the complementary transistor. When a utilization device is coupled to the output electrode of the complementary transistor, it receives an electrical signal when the complementary transistor is activated. Briefly, complementary transistors are transistors which when operating conduct current in opposite directions, i.e., in a p-n-p transistor current will flow from emitter to collector while in its complement, an n-p-n transistor, current flows from collector to emitter.

A major object of the invention, in the provision of various features thereof, is to assure that the capacitor, which is to sense the build-up of voltage as a function of time, shall always start in an uncharged state.

A feature of the time delay embodiments of the invention is means provided for coupling the output electrode of the complementary transistor to the input electrode of the first transistor so as to lock the time delay circuit in the activated state.

Other objects, features and advantages of the invention will be disclosed in the following detailed description when read with the accompanying drawings, wherein.

Figure 1:
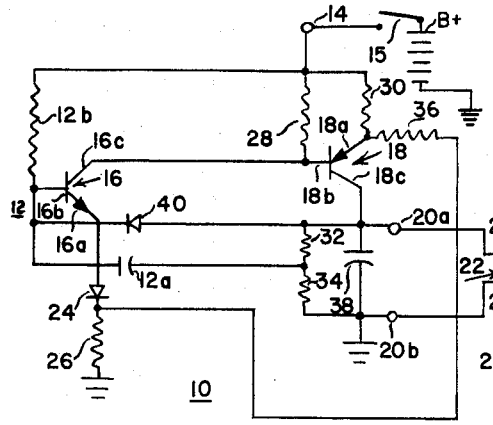
FIGURE 1 is a time delay circuit in accordance with one embodiment of one aspect of the invention.

Referring to FIGURE 1, a time delay circuit 10 is shown comprising a timing network 12 which includes the serially disposed capacitor 12a and resistor 12b coupled to a source of operating potential 14, an n-p-n transistor 16 responsive to the timing network 12, and a p-n-p transistor 18 responsive to the n-p-n transistor 16. A utilization device such as a current control relay 22 is coupled to the output terminals 20a and 20b of the time delay circuit 10.

Generally, the operation of time delay circuit 10 is as follows: The time delay period starts with the turning on of the source of positive potential 14 by the closing of a switch 15 connected to battery B+. At this time, both the n-p-n transistor 16 and the p-n-p transistor 18 are biased to cut off. There is an exponential build-up of voltage across capacitor 12a because of the current flowing through resistor 12b. The magnitudes (the time constant) of the capacitor 12a and resistor 12b determine the duration of the time delay which may range from micro-seconds to minutes. When the voltage build-up reaches a value sufficiently positive to bring the n-p-n transistor 16 out of cut-off, conduction begins and there is an almost instantaueous turning on of the p-n-p transistor 18. The current flowing through the p-n-p transistor 18 energizes relay 22. The energization of relay 22 may be used to generate a control function in an external circuit (not shown). In this way, a time delay is generated whose duration is determined by a suitable choice of the elements of timing network 12. The time delay circuit 10 stalls the activation of an external circuit for a predetermined time after the initial turn-on of electrical power. The transistors must be complements to insure that the first transistor can turn on the second transistor. In general, tandemly connected non-complementary transistors operate like conventional flip-flop circuits. When one transistor is turned on it turns off the other.

More particularly, the n-p-n transistor 16 has an emitter electrode 16a coupled via a diode 24 and a resistor 26 to ground potential, a base electrode 16b coupled to the timing network 12 at the junction of capacitor 12a and resistor 12b, and a collector electrode 16c coupled via a resistor 28 to the source of positive potential 14. The p-n-p transistor 18 has an emitter electrode 18a coupled via a resistor 30 to the source of positive potential 14, a base electrode 18b coupled to the collector electrode 16c of n-p-n transistor 16, and a collector electrode 18c coupled via the serially disposed resistors 32 and 34 to ground potential. Disposed at the outside ends of the resistors 32 and 34 are the output terminals 20a and 20b. A resistor 36 coupled between the end of the resistor 30 at the emitter 18a and the ungrounded end of resistor 26 is used to establish the initial cut-off bias for the n-p-n transistor 16. Cacpcitor 38 in parallel with resistors 32 and 34 provides for an initial grounding of capacitor 12a via resistor 32 to insure that n-p-n transistor 16 is initially cut off.

The time delay starts with the turning on of the source of positive potential 14 by closing the switch 15. A portion of this positive potential is established at the emitter electrode 16a by virtue of the potential divider comprising the resistors 30, 36 and 26. The magnitude of this potential is sufficient to provide cut-off bias for the n-p-n transistor 16. The base electrode 16b is momentarily grounded via capacitor 12a, resistor 32 and capacitor 38 insuring that the time delay circuit 10 starts in the off state. In other words, initially base electrode 16b is very close to ground potential and emitter electrode 16a is at a positive potential; therefore n-p-n transistor 16 is in the cut-off state. The potential of base electrode 16b starts exponentially rising from ground potential because of the accumulation of charge on capacitor 12a via resistor 12b coupled to the source of positive potential 14. When the base-to-emitter potential approaches zero, the n-p-n transistor 16 starts conducting and there is a voltage drop across resistor 28.

Until this time, p-n-p transistor 18 has been cut off since its emitter electrode 18a has been at a less positive potential than its base electrode 18b. However, with the drawing of current through resistor 28, the potential of base electrode 18b starts falling and p-n-p transistor 18 begins conducting. Current flows through the resistors 32 and 34 connected to collector electrode 18c. In particular, voltage is developed across resistor 34 and the potential of the junction of resistor 34 and capacitor 12a rises, causing a positive feed-back via capacitor 12a to base electrode 16b, causing n-p-n transistor 16 to conduct still more. The effect becomes cumulative until both n-p-n transistor 16 and p-n-p transistor 18 snap into their saturation states. When both transistors are in saturation, capacitor 12a rapidly discharges into base electrode 16b.

Generally, if this were the extent of the action, base electrode 16b would assume a potential lower than collector electrode 18c and capacitor 12a would start charging in the opposite direction. To prevent such an action, a diode 40 couples base electrode 16b to collector electrode 18c. Diode 40 is polarized to clamp base electrode 16b to the potential of collector electrode 18c. Thus, capacitor 12a cannot start charging in the opposite direction and capacitor 12a can only then deplete itself of the charge it accumulated via resistor 12b and remain in an uncharged state.

Since all diodes have an inherent forward (conductive) resistance, it is necessary to select resistor 32 to have a resistance equal to the forward resistance of the diode 40 in order to insure that no net potential exists across capacitor 12a so that it remains in the uncharged state.

Diode 40 performs the second function of locking the tmie delay circuit 10 in its "on" state by clamping the base electrode 16b at a potential approximately equal to the emitter electrode 16a.

If now the source of positive potential 14 is momentarily interrupted by the opening of switch 15, the time delay circuit 10 is immediately ready for another delay cycle, since the capacitor 12a is uncharged. There is no need for waiting for the usual discharge or dissipation of energy in this reactive element.

It should be noted that diode 24 is only provided for engineering reasons, since ordinarily n-p-n transistors cannot be back-biased to any appreciable potential. Therefore, the diode 24 permits a greater back-biasing of the base-emitter junction.

Figure 2:
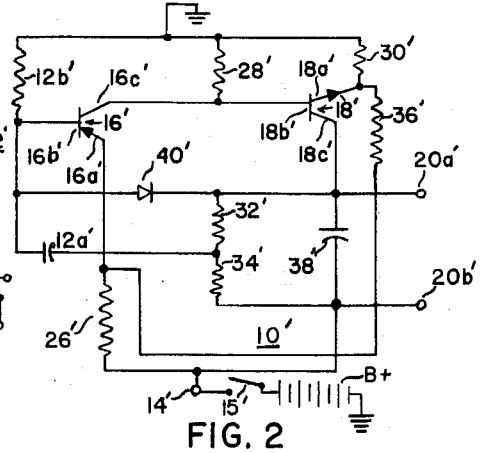
FIGURE 2 is a time delay circuit which is complementary to the time delay circuit of FIGURE 1.

Time delay circuit 10' of FIGURE 2 is the compliment of time delay circuit 10 of FIGURE 1 with corresponding elements identified by the same reference character but with a prime designation added. In other words, the n-p-n transistor 16 of FIGURE 1 is replaced by a p-n-p transistor 16' in FIGURE 2 and p-n-p transistor 18 of FIGURE 1 is replaced by n-p-n transistor 18' of FIGURE 2. Accordingly, source of positive potential 14 is inverted; i.e., all the elements of time delay circuit 10 (FIGURE 1) connected to ground potential are now connected to source of positive potential 14' of time delay circuit 10' (FIGURE 2), and all elements connected to source of positive potential 14 (FIGURE 1) are connected to ground potential in FIGURE 2. The only other change is the reversing of the polarity of diode 40 as indicated by diode 40' in FIGURE 2.

During the operation of time delay circuit 10', the turning on of the source of positive potential 14' by closing a switch 15' lowers the potential of emitter electrode 16a' below the potential of base electrode 16b' and raises the potential of emitter electrode 18a' above the potential of base electrode 18b' and both transistors 16' and 18' are initially cut off. Capacitor 12a' starts accumulating negative charge via resistor 12b' and the potential of the base electrode 16b' starts dropping. When the base-to-emitter potential difference of p-n-p transistor 16' approaches zero, it starts to conduct and current flows from collector 16c' via resistor 28' to ground and the potential of base electrode 18b' starts rising, initiating conduction in n-p-n transistor 18'. There is, therefore, a potential drop at the junction of capacitor 12a' and resistor 34'. This drop in potential is coupled via capacitor 12a' to base electrode 16b' causing transistor 16' to conduct more fully, and a feed-back action similar to that previously described takes over until capacitor 12a' is completely discharged and the transistors 16' and 18' are in saturation. Diode 40' now clamps the base electrode 16b' to the potential of collector electrode 18c' and the circuit is locked in with the capacitor 12a' in an uncharged state. Again, if the potential 14' is momentarily interrupted by the opening of switch 15', the circuit reverts to its original condition and is immediately ready for another cycle.

Figure 3:
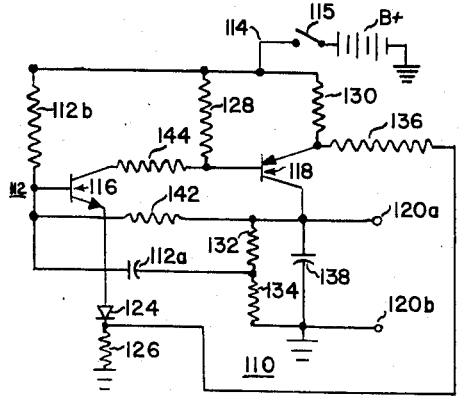
FIGURE 3 is a time delay circuit in accordance with another embodiment of this aspect of the invention.

In FIGURE 3 a time delay circuit 110 is shown which is similar to the time delay circuit 10 of FIGURE 1. Accordingly, all the reference characters of similar elements of time delay circuit 110 have been raised by one hundred. The main difference in time delay circuit 110 is that the diode 40 of FIGURE 1 is replaced by a feed-back resistor 142. Resistors 112b and 142 form a voltage divider network from the source of positive potential 114. Therefore, capacitor 112a does not tend to charge toward the potential of the source of positive potential 114 but to a potential determined by the resistors 112b and 142. In order for the time delay circuit 110 to operate, the following relation must be established between the several resistors:

$$\frac{R_{142} \times E_{bb}}{R_{142} + R_{112}} = \frac{R_{126} \times E_{bb} + E_{be}}{R_{130} + R_{136} + R_{126}}$$

where R equals the magnitude of the resistor and $E_{be}$ equals the stand-off voltage across the base-emitter junction of n-p-n transistor 116. $E_{bb}$ equals the battery voltage. The locking in is now accomplished by the feedback resistor 142.

The capacitor 112a serves the same timing and feedback functions as previously described. Resistor 132 is chosen to insure that when the n-p-n transistor 116 and the p-n-p transistor 118 are in their saturated states, there is no potential drop across capacitor 112a and it is therefore in an uncharged state.

It should be noted that resistor 144 coupling the collector electrode 116c of transistor 116 to the base electrode 118b of transistor 118 serves a dual role. In addition to limiting the current flow through transistor 116 it also insures that the collector electrode of transistor 118 is at a higher potential than the base electrode of transistor 116 when the circuit is in the on state. Thus a current flow through resistor 142 is insured in the on state, locking the circuit.

Figure 4:
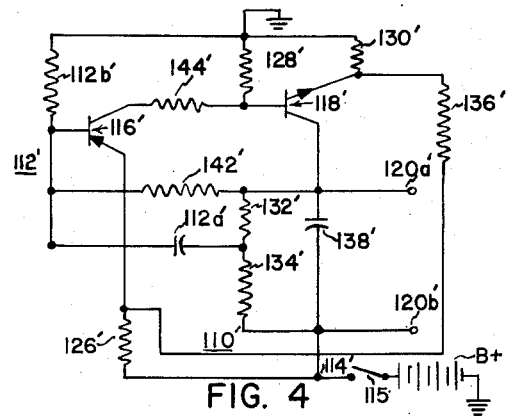
FIGURE 4 is a time delay circuit which is the complement of the time delay circuit of FIGURE 3.

The time delay circuit 110' of FIGURE 4 is very similar to the time delay circuit 10' of FIGURE 2 (with corresponding elements identified by the same reference character plus one hundred), except that again the diode 40' is replaced by a feedback resistor 142'. The magnitude of this resistor is subject to the same conditions as are imposed on the resistor 142 of FIGURE 3.

The above-described time delay circuits are single cycle devices. By modifying these circuits, it is possible to obtain multi-cycle devices which act as intervalometers or periodic pulse generators.

Figure 5:
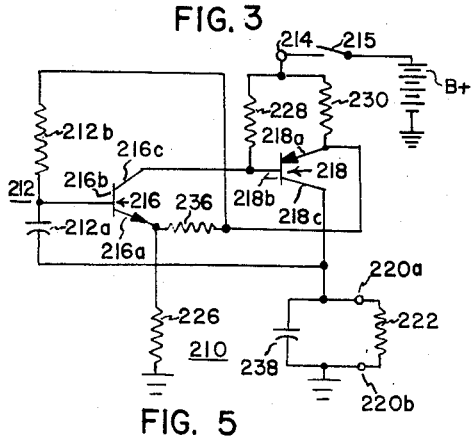
FIGURE 5 is a periodically occurring time interval generator in accordance with another aspect of the invention.

FIGURE 5 shows a periodic pulse generator 210 comprising a timing network 212, an n-p-n transistor 216, and a p-n-p transistor 218. The timing circuit 212 determines the period of the pulse signals developed across a utilization circuit shown as resistor 222 connected to the output terminals 220a and 220b of the periodic pulse generator 210.

In particular, the timing network 212 comprises a capacitor 212a and a resistor 212b which is connected to the base electrode 216b of the n-p-n transistor 216. The emitter electrode 216a of the n-p-n transistor 216 is coupled to ground via a resistor 226 and the collector electrode 216c is coupled to a source of positive potential 214 via a resistor 228. The p-n-p transistor 218 has its emitter electrode 218a coupled to the source of positive potential 214 via a resistor 230, its base electrode 218b connected to the collector electrode 216c of n-p-n transistor 216 and its collector electrode 218c connected via a capacitor 238 to ground. Capacitor 212a of timing network 212 further provides a positive feedback coupling from collector electrode 218c to base electrode 216b. The resistor 230 couples a source of positive potential 214 to emitter electrode 218a and also provides a source of potential for the timing network 212 by virtue of its connection to resistor 212b. Emitter electrode 216a is also coupled via a resistor 236 to the resistor 230 to provide a source of biasing potential for the n-p-n transistor 216. Since the periodic pulse generator 210 is astable with its transistors 216 and 218 periodically alternating between cut-off states and saturation states, the capacitor 238 couples capacitor 212a to ground potential for insuring that both transistors initially start in the cut-off state.

When power is initially turned on by closing the switch 215, a positive potential exists at the emitter electrode 216a of n-p-n transistor 216 because of the potential divider action of the serially disposed resistors 230, 236 and 226. At the same time, base electrode 216b is coupled to ground potential because of the serially disposed capacitors 212a and 238. Therefore, n-p-n transistor 216 is in the cut-off state. Similarly, emitter electrode 218a is at a positive potential intermediate the potential of the source of positive potential 214 and ground potential because of the potential divider action of the serially disposed resistors 230, 236 and 226, and the base electrode 218b is effectively at the potential of the source of positive potential 214. Therefore p-n-p transistor 218 is also in the cut-off state. The potential of base electrode 216b starts rising above ground potential because of the exponential buildup of voltage across capacitor 212a by virtue of the accumulation of charge via resistor 212b. Actually base electrode 216b starts rising toward the potential of emitter electrode 218a. As the base-to-emitter potential of n-p-n transistor 216 comes out of the cut-off region, current starts flowing from the source of positive potential 214 via resistor 228 into collector electrode 216c and the potential of base electrode 218b of p-n-p transistor 218 starts falling. P-n-p transistor 218 starts conducting causing current to flow from the source of positive potential 214 via resistor 230, emitter electrode 218a, collector electrode 218b and utilization device 222 to ground. Therefore, the potential of collector electrode 218c starts rising. This positive going potential is fed back via capacitor 212a to base electrode 216b, causing n-p-n transistor 216 to conduct more fully. The action becomes cumulative until both the n-p-n transistor 216 and the p-n-p transistor 218 go into states of saturation. Capacitor 212a completely discharges and proceeds to charge in the opposite polarity. As the capacitor 212a starts charging in this direction, the current flowing into base electrode 216b diminishes to a point which cannot sustain conduction through n-p-n transistor 216 and therefore it starts moving towards the cut-off state. In particular, less current flows through resistor 228 and the potential of base electrode 218b starts rising. The rise in potential of base electrode 218b diminishes the flow of current through p-n-p transistor 218 and the potential of its emitter electrode 218a starts falling. This decreasing potential is fed back via capacitor 212a to base electrode 216b of n-p-n transistor 216, causing it to move further towards cut-off. The action now becomes cumulative until both transistors reach their cut-off states. At this time capacitor 212a starts discharging until it becomes completely discharged and starts again charging in the first direction to renew the cycle.

Figure 6:
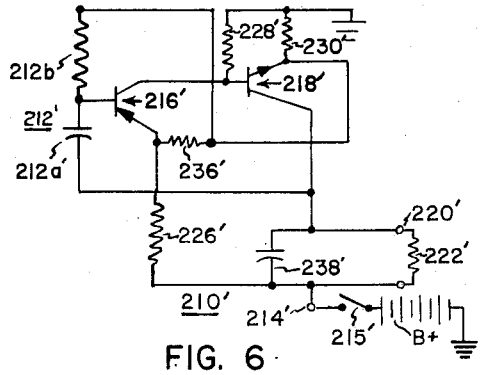
FIGURE 6 is a periodically occurring time interval generator which is the complement of the time interval generator of FIGURE 5.

Periodic pulse generator 210' of FIGURE 6 is the complement of periodic pulse generator 210 of FIGURE 5. Since both circuits are nearly identical, corresponding reference characters are primed. The only difference in the two circuits is that the transistor 216' is a p-n-p transistor and the transistor 218' is an n-p-n transistor. Accordingly, the polarities of the biasing and operating potentials are reversed. Therefore, all elements of the periodic pulse generator 210 (FIGURE 5) that are coupled to the source of postive potential 214 are coupled to ground in periodic pulse generator 210' (FIGURE 6), and all elements of periodic pulse generator 210 (FIGURE 5) which are coupled to ground potential are coupled to a source of positive potential 214' in periodic pulse generator 210' (FIGURE 6). Since the circuits are identical except for their complementary features, they work in very similar manners and therefore the operation of the periodic pulse generator 210' will not be discussed.

There has thus been shown improved timing circuits which can generate very precise and highly reproducible time intervals. These time intervals can range anywhere in the order from micro-seconds to minutes. These timing circuits fall into two classes: One is the single-cycle type of a time delay circuit which is instantaneously recyclicable. The other is a multi-cycle time delay circuit which may be used as an intervalometer or a periodic pulse generator. The disclosed timing circuits are highly reliable and easily reproducible and because of the use of transistors are rugged, compact and relatively inexpensive.

It will now be obvious to those skilled in the art, many modifications and variations which accomplish all or part of the foregoing objects, but which do not depart essentially from the invention as defined in the claims which follow.

What is claimed is:

1. An electronic circuit comprising a first transistor having an input electrode, an output electrode and a reference electrode, a complementary transistor having an input electrode, an output electrode and a reference electrode, a source of operating potential having a first terminal at a first potential and a second terminal at a second potential, means for coupling the output electrode of said complementary transistor to said second terminal, means for establishing on the reference electrode of said first transistor a potential intermediate said first and second potentials to initially bias said first transistor cut-off, means for coupling the reference electrode of said complementary transistor to said first terminal, means for coupling the output electrode of said first transistor to the input electrode of said complementary transistor, a timing network including a resistor and a capacitor in series connected to be responsive to said source of operating potential, and means connecting the input electrode of said first transistor to said timing network and means constituting a feed-back circuit from the output electrode of the complementary transistor to the input electrode of the first transistor for controlling an operating condition of the timing network, said feed-back circuit including means for applying balanced voltages on both terminals of the capacitor to control the condition of charge in the capacitor.

2. An electronic circuit comprising a first transistor having a base electrode, a collector electrode, and an emitter electrode, a complementary transistor having a base electrode, a collector electrode, and an emitter electrode, a source of operating potential having a first terminal at a first potential and a second terminal at a second potential, means for coupling the collector terminal of said complementary transistor to said second terminal, means for establishing on the emitter electrode of said first transistor a potential intermediate said first and second potentials to initially bias said first transistor cut-off, means for coupling the emitter electrode of said complementary transistor to said first terminal, means for coupling the collector electrode of said first transistor to the base electrode of said complementary transistor, a timing network including a resistor and a capacitor in series connected to be responsive to said source of operating potential, and means directly connecting the base electrode of said first transistor to said timing network, and means constituting a feed-back circuit from the output electrode of the complementary transistor to the input electrode of the first transistor for controlling an operating condition of the timing network, said feed-back circuit including means for applying balanced voltages on both terminals of the capacitor to control the condition of charge in the capacitor.

3. An electronic circuit comprising a first transistor having a base electrode, a collector electrode, and an emitter electrode, a complementary transistor having a base electrode, a collector electrode, and an emitter electrode, a source of operating potential having a first terminal at a first potential and a second terminal at a second potential, means for coupling the collector electrode of said complementary transistor to said second terminal, means for establishing on the emitter electrode of said first transistor a potential intermediate said first and second potentials to initially bias said first transistor cut-off, means for coupling the emitter electrode of said complementary transistor to said first terminal, means for coupling the collector electrode of said first transistor to the base electrode of said complementary transistor, a timing network including a resistor and a capacitor in series connection responsive to said source of operating potential, means for directly connecting the base electrode of said first transistor to the junction of said resistor and capacitor of said timing network, and means for coupling the collector electrode of said complementary transistor to the base electrode of said first transistor, said coupling means including means for applying balanced voltages on both terminals of the capacitor to control the condition of charge in the capacitor.

4. An electronic circuit comprising a first transistor having an input electrode, an output electrode and a reference electrode, a complementary transistor having an input electrode, an output electrode and a reference electrode, a source of operating potential having first and second terminals respectively at first and second potentials, means for coupling the output electrode of said complementary transistor to said second terminal, means for establishing on the reference electrode of said first transistor a potential intermediate said first and second potentials to initially bias said first transistor cut-off, means for coupling the reference electrode of said complementary transistor to said first terminal, means for coupling the output electrode of said first transistor to the input electrode of said complementary transistor, a resistor coupling the input electrode of said first transistor to said first terminal, and means including a capacitor for coupling the output electrode of said complementary transistor to the input electrode of said first transistor, said capacitor-including coupling means also including means for applying balanced voltages on both terminals of the capacitor to control the condition of charge in the capacitor.

5. An electronic circuit comprising a first transistor having a base electrode, a collector electrode, and an emitter electrode, a complementary transistor having a base electrode, a collector electrode and an emitter electrode, a source of operating potential having first and second terminals respectively at first and second potentials, means for coupling the collector electrode of said first transistor to said first terminal, means for coupling the collector electrode of said complementary transistor to said second terminal, means for establishing on the emitter electrode of said first transistor a potential intermediate said first and second potentials to initially bias said first transistor cut-off, means for coupling the emitter electrode of said complementary transistor to said first terminal, means for coupling the collector electrode of said first transistor to the base electrode of said complementary transistor, a resistor coupling the base electrode of said first transistor to one of the terminals and a capacitor coupling the collector electrode of said complementary transistor to the base electrode of said first transistor, and means coupling said collector electrode of said complementary transistor to both terminals of said capacitor to control the condition of charge in said capacitor.

6. An electronic circuit comprising a first transistor having a base electrode, a collector electrode, and an emitter electrode, a complementary transistor having a base electrode, a collector electrode and an emitter electrode, a switchable source of operating potential having first and second terminals, said first and second terminals being respectively at first and second potentials when said switchable source is in a predetermined condition, means for coupling the collector electrode of said complementary transistor to said second terminal, means for establishing on the emitter electrode of said first transistor a potential intermediate said first and second potentials to initially bias said first transistor cut-off, means for coupling the emitter electrode of said complementary transistor to said first terminal, means for coupling the collector electrode of said first transistor to the base electrode of said complementary transistor, a resistor coupling the base electrode of said first transistor to said first terminal, and means including a capacitor coupling the collector electrode of said complementary transistor to the base electrode of said first transistor, said capacitor-including coupling means further including a resistor and a diode respectively between said collector electrode of said complementary transistor and the respective ends of said capacitor.

7. An electronic circuit comprising a first transistor having an input electrode, an output electrode and a reference electrode, a complementary transistor having an input electrode, an output electrode and a reference electrode, a source of operating potential having first and second terminals respectively at first and second potentials, means for coupling the output electrode of said first transistor to said first terminal, means for coupling the output electrode of said complementary transistor to said second terminal, means connected to said input and reference electrodes of the first transistor for applying potentials for initially biasing said first transistor non-conducting means for coupling the reference electrode of said complementary transistor to said first terminal, means for coupling the output electrode of said first transistor to the input electrode of said complementary transistor, a resistor coupling the input electrode of said first transistor to said first terminal, and a capacitor and a unidirectional conducting device in parallel coupling the output electrode of said complementary transistor to the input electrode of said first transistor.

8. An electronic circuit comprising an n-p-n transistor having a base electrode, a collector electrode, and an emitter electrode, a p-n-p transistor having a base electrode, a collector electrode and an emitter electrode, a source of operating potential having first and second terminals respectively at first and second potentials, means for coupling the collector electrode of said n-p-n transistor to said first terminal, means for coupling the collector electrode of said p-n-p transistor to said second terminal, means connected to said input and emitter electrodes of the first transistor for applying potentials for initially biasing said n-p-n transistor non-conducting, means for coupling the emitter electrode of said p-n-p transistor to said first terminal, means for coupling the collector electrode of said n-p-n transistor to the base electrode of said p-n-p transistor, a resistor coupling the base electrode of said n-p-n transistor to said first terminal, and a capacitor and a unidirectional conducting device in parallel coupling the collector electrode of said p-n-p transistor to the base electrode of said n-p-n transistor.

9. An electronic circuit comprising a p-n-p transistor having a base electrode, a collector electrode, and an emitter electrode, a n-p-n transistor having a base electrode, a collector electrode and an emitter electrode, a source of operating potential having first and second terminals respectively at first and second potentials, means for coupling the collector electrode of said p-n-p transistor to said first terminal, means for coupling the collector electrode of said n-p-n transistor to said second terminal, means for establishing at the emitter electrode of said p-n-p transistor a potential intermediate said first and second potentials, means for coupling the emitter electrode of said n-p-n transistor to said first terminal, means for coupling the collector electrode of said p-n-p transistor to the base electrode of said n-p-n transistor, a resistor coupling the base electrode of said p-n-p transistor to said first terminal, and a capacitor and a unidirectional conducting device in parallel coupling the collector electrode of said n-p-n transistor to the base electrode of said p-n-p transistor.

10. An electronic circuit comprising a first transistor having an input electrode, an output electrode and a reference electrode, a complementary transistor having an input electrode, an output electrode and a reference electrode, a source of potential having first and second terminals respectively at first and second potentials, means for coupling the output electrode of said first transistor to said first terminal, means for coupling the output electrode of said complementary transistor to said second terminal, means for establishing at the reference electrode of said first transistor a potential intermediate said first and second potentials, means for coupling the reference electrode of said complementary transistor to said first terminal, means for coupling the output electrode of said first transistor to the input electrode of said complementary transistor, a resistor coupling the input electrode of said first transistor to said first terminal, and a capacitor and a resistor in parallel coupling the output electrode of said complementary transistor to the input electrode of said first transistor.

11. An electronic circuit comprising an n-p-n transistor having a base electrode, a collector electrode, and an emitter electrode, a p-n-p transistor having a base electrode, a collector electrode and an emitter electrode, a source of potential having first and second terminals respectively at first and second potentials, means for coupling the collector electrode of said n-p-n transistor to said first terminal, means for coupling the collector electrode of said p-n-p transistor to said second terminal, means for establishing at the emitter electrode of said n-p-n transistor a potential intermediate said first and second potentials, means for coupling the emitter electrode of said p-n-p transistor to said first terminal, means for coupling the collector electrode of said n-p-n transistor to the base electrode of said p-n-p transistor, a resistor coupling the base electrode of said n-p-n transistor to said first terminal, and a capacitor and a resistor in parallel coupling the collector electrode of said p-n-p transistor to the base electrode of said n-p-n transistor.

12. An electronic circuit comprising a p-n-p transistor having a base electrode, a collector electrode, an n-p-n transistor having a base electrode, a collector electrode and an emitter electrode, a source of potential having first and second terminals respectively at first and second potentials, means for coupling the collector electrode of said p-n-p transistor to said first terminal, means for coupling the collector electrode of said n-p-n transistor to said second terminal, means for establishing at the emitter electrode of said p-n-p transistor a potential intermediate said first and second potentials, means for coupling the emitter electrode of said n-p-n transistor to said first terminal, means for coupling the collector electrode of said p-n-p transistor to the base electrode of said n-p-n transistor, a resistor coupling the base electrode to said p-n-p transistor to said first terminal, and a capacitor and a resistor in parallel coupling the collector electrode of said n-p-n transistor to the base electrode of said p-n-p transistor.

13. An electronic circuit comprising a first transistor having an input electrode, an output electrode and a reference electrode, a complementary transistor having an input electrode, an output electrode and a reference electrode, a source of potential having first and second terminals respectively at first and second potentials, means for coupling the output electrode of said first transistor to said first terminal, means for coupling the reference electrode of said complementary transistor to said first terminal, means for establishing at the reference electrode of said first transistor a potential intermediate said first and second potentials, first and second serially-disposed resistors coupling the output electrode of said complementary transistor to said second terminal, a third resistor coupling the input electrode of said first transistor to said first terminal, means coupling the output electrode of the first transistor to the input electrode of the complementary transistor, a capacitor coupling the junction of said first and second serially-disposed resistors to the input electrode of said first transistor, and a unidirectional conducting means coupling the output electrode of said complementary transistor to the input electrode of said first transistor 14. An electronic circuit comprising an n-p-n transistor having a base electrode, a collector electrode and an emitter electrode, a p-n-p transistor having a base electrode, a collector electrode and an emitter electrode, a source of potential having first and second terminals respectively at first and second potentials, means for coupling the collector electrode of said n-p-n transistor to said first terminal, means for coupling the emitter electrode of said p-n-p transistor to said first terminal, means for establishing at the emitter electrode of said n-p-n transistor a potential intermediate said first and second potentials, first and second serially disposed resistors coupling the collector electrode of said p-n-p transistor to said second terminal, a third resistor coupling the base electrode of said n-p-n transistor to said first terminal, means coupling the output electrode of the n-p-n transistor to the input electrode of the p-n-p transistor, a capacitor coupling the junction of said first and second serially disposed resistors to the base electrode of said n-p-n transistor, and a unidirectional conducting means coupling the collector electrode of said p-n-p transistor to the base electrode of said n-p-n transistor.

15. An electronic circuit comprising a p-n-p transistor having a base electrode, a collector electrode and an emitter electrode, an n-p-n transistor having a base electrode, a collector electrode and an emitter electrode, a source of potential having first and second terminals respectively at first and second potentials, means for coupling the collector electrode of said p-n-p transistor to said first terminal, means for coupling the emitter electrode of said n-p-n transistor to said first terminal, means for establishing at the emitter electrode of said p-n-p transistor a potential intermediate said first and second potentials, first and second serially disposed resistors coupling the collector electrode of said n-p-n transistor to said second terminal, a third resistor coupling the base electrode of said p-n-p transistor to said first terminal, means coupling the otuput electrode of the p-n-p transistor to the input electrode of the n-p-n transistor, a capacitor coupling the junction of said first and second serially disposed resistors to the base electrode of said p-n-p transistor, and a unidirectional conducting means coupling the collector electrode of said n-p-n transistor to the base electrode of said p-n-p transistor.

16. An electronic circuit comprising a first transistor having an input electrode, an output electrode, and a reference electrode, a complementary transistor having an input electrode, an output electrode and a reference electrode, a source of potential having first and second terminals respectively at first and second potentials, means for coupling the output electrode of said first transistor to said first terminal, means for coupling the reference electrode of said complementary transistor to said first terminal, means for establishing at the reference electrode of said first transistor a potential intermediate said first and second potentials, first and second serially disposed resistors coupling the output electrode of said complementary transistor to said second terminal, a third resistor coupling the input electrode of said first transistor to said first terminal, a capacitor coupling the junction of said first and second serially disposed resistors to the input electrode of said first transistor, a fourth resistor coupling the output electrode of said complementary transistor to the input electrode of said first transistor, and means coupling the output electrode of the first transistor to the input electrode of the complementary transistor.

17. An electronic circuit comprising an n-p-n transistor having a base electrode, a collector electrode, and an emitter electrode, a p-n-p transistor having a base electrode, a collector electrode and an emitter electrode, a source of potential having first and second terminals respectively at first and second potentials, means for coupling the collector electrode of said n-p-n transistor to said first terminal, means for coupling the emitter electrode of said p-n-p transistor to said first terminal, means for establishing at the emitter electrode of said n-p-n transistor a potential intermediate said first and second potentials, first and second serially disposed resistors coupling the collector electrode of said p-n-p transistor to said second terminal, a third resistor coupling the base electrode of said n-p-n transistor to said first terminal, a capacitor coupling the junction of said first and second serially disposed resistors to the base electrode of said n-p-n transistor, a fourth resistor coupling the collector electrode of said p-n-p transistor to the base electrode of said n-p-n transistor, and means coupling the collector electrode of the n-p-n transistor to the base electrode of the p-n-p transistor.

18. An electronic circuit comprising a p-n-p transistor having a base electrode, a collector electrode, and an emitter electrode, an n-p-n transistor having a base electrode, a collector electrode and an emitter electrode, a source of potential having first and second terminals respectively at first and second potentials, means for coupling the collector electrode of said p-n-p transistor to said first terminal, means for coupling the emitter electrode of said n-p-n transistor to said first terminal, means for establishing at the emitter electrode of said p-n-p transistor, a potential intermediate said first and second potentials, first and second serially disposed resistors coupling the collector electrode of said n-p-n transistor to said second terminal, a third resistor coupling the base electrode of said p-n-p transistor to said first terminal, a capacitor coupling the junction of said first and second serially disposed resistors to the base electrode of said p-n-p transistor, a fourth resistor coupling the collector electrode of said n-p-n transistor to the base electrode of said p-n-p transistor, and means coupling the collector electrode of said p-n-p transistor to the base electrode of said n-p-n transistor.

19. An electronic circuit comprising an n-p-n transistor having a base electrode, a collector electrode and an emitter electrode, a p-n-p transistor having a base electrode, a collector electrode and an emitter electrode, a source of potential having first and second terminals respectively at first and second potentials, a first resistor coupling the collector electrode of said n-p-n transistor to said first terminal, a second resistor coupling the emitter electrode of said n-p-n transistor to said second terminal, a third resistor coupling the emitter electrode of said p-n-p transistor to said first terminal, a fourth resistor coupling the emitter electrode of said n-p-n transistor to the emitter of said p-n-p transistor, a utilization circuit coupling the collector electrode of said p-n-p transistor to said second terminal, fifth and sixth serially disposed resistors in parallel with said utilization circuit, a first capacitor in parallel with said utilization circuit, a seventh resistor coupling the base electrode of said n-p-n transistor to said first terminal, a second capacitor coupling the junction of said fifth and sixth resistors to the base electrode of said n-p-n transistor, a diode having its cathode coupled to the base electrode of said n-p-n transistor and its anode coupled to the collector electrode of said p-n-p transistor, and means for coupling the collector electrode of said n-p-n transistor to the base electrode of said p-n-p transistor.

20. An electronic circuit comprising a p-n-p transistor having a base electrode, a collector electrode and an emitter electrode, a n-p-n transistor having a base electrode, a collector electrode and an emitter electrode, a source of potential having first and second terminals respectively at first and second potentials, a first resistor coupling the collector electrode of said p-n-p transistor to said first terminal, a second resistor coupling the emitter electrode of said p-n-p transistor to said second terminal, a third resistor coupling the emitter electrode of said n-p-n transistor to said first terminal, a fourth resistor coupling the emitter electrode of said p-n-p transistor to the emitter electrode of said n-p-n transistor, a utilization circuit coupling the collector electrode of said n-p-n transistor to said second terminal, fifth and sixth serially disposed resistors in parallel with said utilization circuit, a first capacitor in parallel with said utilization circut, a seventh resistor coupling the base electrode of said n-p-n transistor to said first terminal, a second capacitor coupling the junction of said fifth and sixth resistors to the base electrode of said p-n-p transistor, a diode having its anode coupled to the base electrode of said p-n-p transistor and its cathode coupled to the collector electrode of said n-p-n transistor, and means for coupling the collector electrode of said p-n-p transistor to the base electrode of said n-p-n transistor.

21. An electronic circuit comprising an n-p-n transistor having a base electrode, a collector electrode and an emitter electrode, a p-n-p transistor having a base electrode, a collector electrode and an emitter electrode, a source of potential having first and second terminals respectively at first and second potentials, a first resistor coupling the collector electrode of said n-p-n transistor to said first terminal, a second resistor coupling the emitter electrode of said n-p-n transistor to said second terminal, a third resistor coupling the emitter electrode of said p-n-p transistor to said first terminal, a fourth resistor coupling the emitter electrode of said p-n-p transistor to the emitter electrode of said n-p-n transistor, a utilization circuit coupling the collector electrode of said p-n-p transistor to said second terminal, fifth and sixth serially disposed resistors in parallel with said utilization circuit, a first capacitor in parallel with said utilization circuit, a seventh resistor coupling the base electrode of said n-p-n transistor to said first terminal, a second capacitor coupling the junction of said fifth and sixth resistors to the base electrode of said n-p-n transistor, an eighth resistor coupling to the base electrode of said n-p-n transistor to the collector electrode of said p-n-p transistor, and means for coupling the collector electrode of n-p-n transistor to the base electrode of said p-n-p transistor.

22. An electronic circuit comprising a p-n-p transistor having a base electrode, a collector electrode and an emitter electrode, an n-p-n transistor having a base electrode, a collector electrode and an emitter electrode, a source of potential having first and second terminals respectively at first and second potentials, a first resistor coupling the collector electrode of said p-n-p transistor to said first terminal, a second resistor coupling the emitter electrode of said p-n-p transistor to said second terminal, a third resistor coupling the emitter electrode of said n-p-n transistor to said first terminal, a fourth resistor coupling the emitter electrode of said n-p-n transistor to the emitter electrode of said p-n-p transistor, a utilization circuit coupling the collector electrode of said n-p-n transistor to said second terminal, fifth and sixth serially disposed resistors in parallel with said utilization circuit, a first capacitor in parallel with said utilization circuit, a seventh resistor coupling the base electrode of said p-n-p transistor to said first terminal, a second capacitor coupling the junction of said fifth and sixth resistors to the base electrode of said p-n-p transistor, an eighth resistor coupling the base electrode of said p-n-p transistor to the collector electrode of said n-p-n transistor, and means for coupling the collector electrode of said p-n-p transistor to the base electrode of said n-p-n transistor.

23. An electronic circuit comprising an n-p-n transistor having a base electrode, a collector electrode and an emitter electrode, a p-n-p transistor having a base electrode, a collector electrode and an emitter electrode, a source of potential having first and second terminals respectively at first and second potentials, a first resistor coupling the collector electrode of said n-p-n transistor to said first terminal, a second resistor coupling the emitter electrode of said n-p-n transistor to said second terminal, a third resistor coupling the emitter electrode of said p-n-p transistor to said first terminal, a fourth resistor coupling the emitter electrode of said n-p-n transistor to the emitter electrode of said p-n-p transistor, a utilization circuit coupling the collector electrode of said p-n-p transistor to said second terminal, a first capacitor in parallel with said utilization circuit, a fifth resistor coupling the base electrode of said n-p-n transistor to the emitter electrode of said p-n-p transistor, a second capacitor coupling the base electrode of said n-p-n transistor to the collector electrode of said p-n-p transistor, and means for coupling the collector electrode of said n-p-n transistor to the base electrode of said p-n-p transistor.

24. An electronic circuit comprising a p-n-p transistor having a base electrode, a collector electrode and an emitter electrode, an n-p-n transistor having a base electrode, a collector electrode and an emitter electrode, a source of potential having first and second terminals respectively at first and second potentials, a first resistor coupling the collector electrode of said p-n-p transistor to said first terminal, a second resistor coupling the emitter electrode of said p-n-p transistor to said second terminal, a third resistor coupling the emitter of said n-p-n transistor to said first terminal, a fourth resistor coupling the emitter electrode of said n-p-n transistor to the emitter electrode of said p-n-p transistor, a utilization circuit coupling the collector electrode of said n-p-n transistor to said second terminal, a first capacitor in parallel with said utilization circuit, a fifth resistor coupling the base electrode of said p-n-p transistor to the emitter electrode of said n-p-n transistor, a second capacitor coupling the base electrode of said p-n-p transistor to the collector electrode of said n-p-n transistor, and means for coupling the collector electrode of said p-n-p transistor to the base electrode of said n-p-n transistor.

25. The electronic circuit of claim 7 wherein said capacitor couples signal from the output electrode of said complementary transistor to drive said first transistor into saturation for discharging said capacitor after charge accumulated by said capacitor renders said first transistor conducting.

26. The electronic circuit of claim 25 wherein said unidirectional conductive device is so polarized to prevent said capacitor from accumulating charge polarized opposite to the initial charge and to maintain said first transistor conducting.

27. The electronic circuit of claim 8 wherein said capacitor couples signal from the collector electrode of said p-n-p transistor to drive said n-p-n transistor into saturation for discharging said capacitor after the charge accumulated by said capacitor renders said n-p-n transistor conducting.

28. The electronic circuit of claim 27 wherein said unilateral conducting device is so polarized to prevent said capacitor from accumulating charge polarized opposite the initial charge and to maintain said n-p-n transistor conducting.

29. An electronic timing circuit, comprising (a) a charging circuit including a resistor and a capacitor;
(b) a source of voltage;
(c) means for connecting said source to said charging circuit to charge said capacitor through said resistor;
(d) an input sensing transistor having an input base electrode, a collector electrode and an emitter electrode, with the base electrode connected to the timing circuit to respond to the voltage across the capacitor;
(e) an output transistor for connecting said voltage source to an external load circuit;
(f) means coupling the collector electrode of the first transistor to the input base electrode of said output transistor to cause said output transistor to operate when the input transistor senses a predetermined voltage accumulated across the capacitor; and
(g) means responsive to operation of the output transistor for establishing feed-back control on the capacitor in said charging circuit, said operation-responsive means including means for applying balanced voltages on both terminals of the capacitor to control the condition of charge in the capacitor.

References Cited in the file of this patent
UNITED STATES PATENTS

| | | |
|---|---|---|
| 2,788,449 | Bright | Apr. 9, 1957 |
| 2,829,257 | Root | Apr. 1, 1958 |
| 2,837,663 | Walz | June 3, 1958 |
| 2,840,728 | Haugk | June 24, 1958 |
| 2,892,103 | Scarbrough | June 23, 1959 |